(12) United States Patent
Chen et al.

(10) Patent No.: US 11,494,641 B2
(45) Date of Patent: Nov. 8, 2022

(54) REINFORCEMENT LEARNING FOR HUMAN ROBOT INTERACTION

(71) Applicant: INTEL COPRPORATION, Santa Clara, CA (US)

(72) Inventors: Hu Tiger Chen, Beijing (CN); Zhongxuan Liu, Beijing (CN); Yimin Zhang, Beijing (CN); Haibing Ren, Beijing (CN); Jiankun Hu, Shenzhen (CN)

(73) Assignee: Intel Corporation, Santa Clara, CA (US)

( * ) Notice: Subject to any disclaimer, the term of this patent is extended or adjusted under 35 U.S.C. 154(b) by 405 days.

(21) Appl. No.: 16/651,282

(22) PCT Filed: Dec. 27, 2017

(86) PCT No.: PCT/CN2017/118813
§ 371 (c)(1),
(2) Date: Mar. 26, 2020

(87) PCT Pub. No.: WO2019/127063
PCT Pub. Date: Jul. 4, 2019

(65) Prior Publication Data
US 2020/0226463 A1  Jul. 16, 2020

(51) Int. Cl.
*G06N 3/08*  (2006.01)
*G05B 15/02*  (2006.01)

(52) U.S. Cl.
CPC .............. *G06N 3/08* (2013.01); *G05B 15/02* (2013.01)

(58) Field of Classification Search
CPC ......... G06N 3/08; G06N 3/088; G05B 13/027
See application file for complete search history.

(56) References Cited

U.S. PATENT DOCUMENTS

2009/0234783 A1   9/2009  Hamagami et al.
2015/0306761 A1*  10/2015 O'Connor ............ G05D 1/0221
                                                              700/250
(Continued)

FOREIGN PATENT DOCUMENTS

CN       107357757 A      11/2017
WO    WO-2019127063 A1    7/2019

OTHER PUBLICATIONS

"International Application Serial No. PCT/CN2017/118813, International Search Report dated Sep. 27, 2018", 5 pgs.
(Continued)

*Primary Examiner* — Kevin Kim
(74) *Attorney, Agent, or Firm* — Schwegman Lundberg & Woessner, P.A.

(57) ABSTRACT

A system and method of teaching a neural network through reinforcement learning methodology. The system includes a machine-readable medium having one or more processors that perform a motion task to produce a first result corresponding to navigating a device during a first episode and performing an interaction task during that same episode. After completion of the first episode a processor calculates a Q value change based on the first task result and the second task result. The processor then modifies parameters based on the Q value change such that during subsequent episode iterations the motion task and interactive task are improved and a smooth and continuous transition occurs between these two tasks.

24 Claims, 10 Drawing Sheets

(56) References Cited

U.S. PATENT DOCUMENTS

| | | | |
|---|---|---|---|
| 2016/0096272 A1* | 4/2016 | Smith | G05D 1/0088 |
| | | | 700/255 |
| 2016/0292568 A1* | 10/2016 | Schaul | G06N 20/00 |
| 2017/0106542 A1* | 4/2017 | Wolf | B25J 13/02 |
| 2017/0228662 A1* | 8/2017 | Gu | G06N 3/0427 |
| 2019/0258918 A1* | 8/2019 | Wang | G06N 3/0472 |

OTHER PUBLICATIONS

"International Application Serial No. PCT/CN2017/118813, International Written Opinion dated Sep. 27, 2018", 4 pgs.

* cited by examiner

REINFORCEMENT LEARNING FOR HUMAN ROBOT INTERACTION

PRIORITY APPLICATION

This application is a U.S. National Stage Application under 35 U.S.C. 371 from International Application No. PCT/CN2017/118813, filed 27 Dec. 2017, published as WO 2019/127063, which is incorporated herein by reference in its entirety.

TECHNICAL FIELD

Embodiments described herein generally relate to artificial intelligence and more specifically to reinforcement learning for human robot interaction.

BACKGROUND

Human robot interaction is an important technology for a service robot. During such service, the robot needs to be perceived as smart, polite, and natural. In particular, robots are desired to be able to perform multiple functions, including following, approaching, facing, and finding people or specific objects, all while interacting with people (e.g., delivering packages, taking orders, etc.).

A variety of techniques have been tried to provide competent service robots. For example, a robot action policy that follows pre-defined rules may be employed. Such technologies are often flawed because the rules are forced to account for every scenario the robot would encounter, resulting in complicated and time consuming rule construction and testing. Once a situation arises that isn't accounted for within the pre-defined rules, the robot becomes confused. Additionally, rules are typically pre-defined by human experience, not allowing the robot to improve. As an example, robot navigation typically utilizes a region map and planed global trajectory. While a robot may determine local planning and obstacle avoidance, problems occur when the map changes or large dynamic obstacles are presented. Similarly, solutions directed toward robot human interaction may be flawed in that in order for a pre-defined rule to be followed, initial human interaction or manipulation is required.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
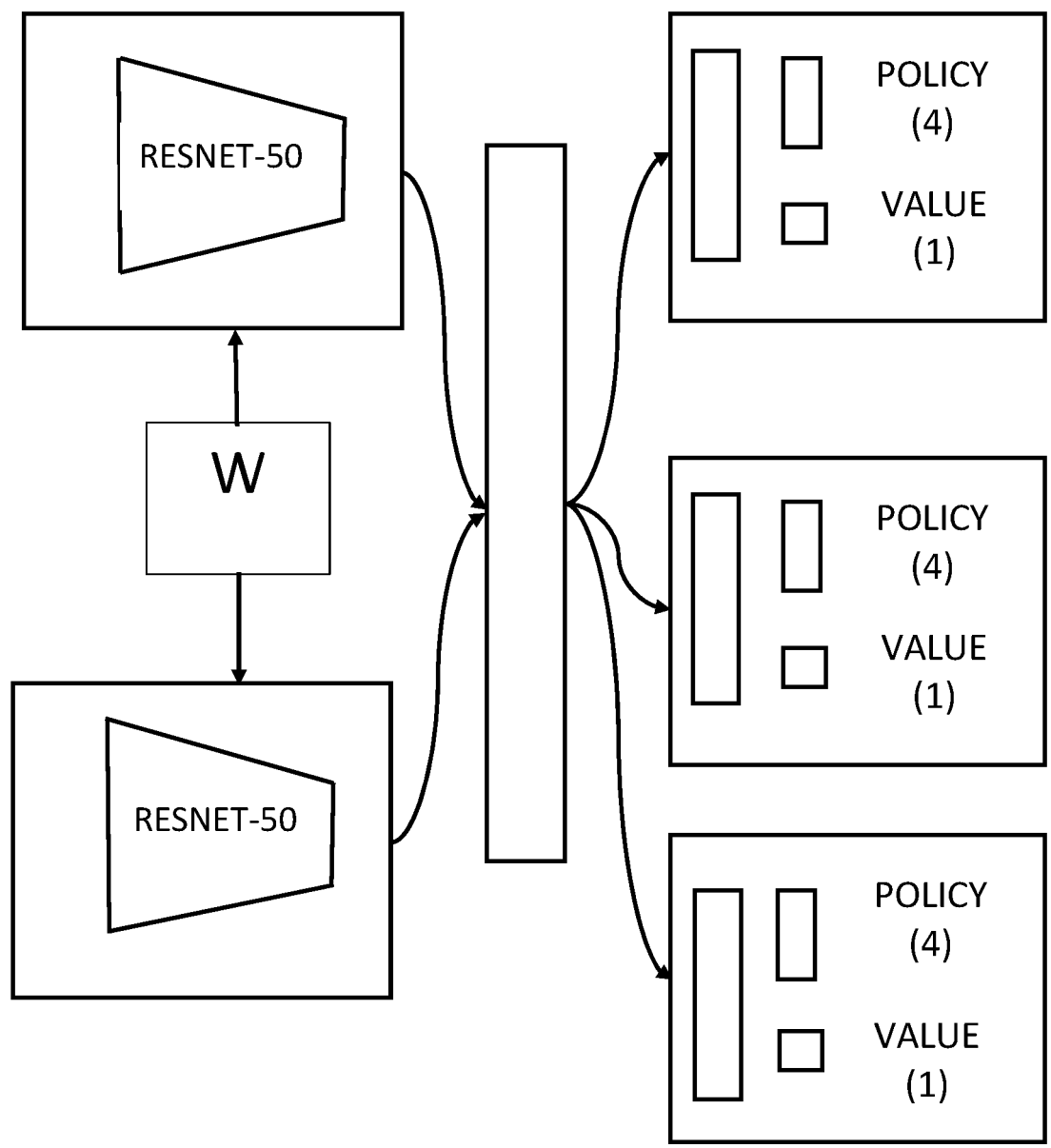
FIG. 1 is a prior art block diagram of an example of a system for teaching an artificial neural network through reinforcement learning.

An artificial neural network (ANN or neural network) is a computational model based on connections between artificial neurons. Generally neural networks define a structure and training regimen that is used to modify the structure to accomplish a task, such as image classification, decision making, etc. Thus, neural networks are trained (e.g., the network learns from training) rather than explicitly programmed, as is the case in rules-based systems. In relation to robots, the neural network provides decision making capabilities in order to utilize hardware to accomplish the specific task, such as navigation, robot movement, robot to human interaction or the like.

Reinforcement learning is a method that may be utilized by a neural network to provide decision making for a task. Reinforcement learning models sequential decision making theory or policy in order to perform the task. Sequential decision making theory, in general, is a statistical theory wherein successive observations, inputs, or decisions are made or received before a final decision is made or task is completed. In this manner, feedback is not immediately provided for individual decisions or actions taken during a task and instead a direct reward for performance is provided after the task is complete.

Reinforcement learning techniques, also referred to as a deep Q network or deep reinforcement learning, determine a Q value for actions taken by the neural network in performing a task. An e-greedy exploration is used based on experience replay. After completion of the task, system parameters are updated based on performance. The task is then iteratively performed and parameters iteratively updated for each performance. For example, after completion of a task, a mini batch of samples of previous iterations of the task are obtained from the replay memory. The neural network then calculates the expected "y", or performance with network parameters. A loss function is then calculated and the network parameters are updated via a direct reward to minimize the loss function for future iterations. The updated parameters are then utilized in the next iteration of the task.

These techniques have been used to play video games in order to outperform professional gamers. For example, the neural network plays a game to completion and a Q value is determined for the game play actions. Once the Q value is determined, a direct reward and loss are calculated and a reward signal sent to the neural network. For example, the direct reward may be a point value assigned as a result of actions taken in the game. That direct reward is then used in the reinforcement learning algorithm. During the next episode or task performance (e.g., playing the video game an additional time) the neural network takes actions based on the previous Q value to optimize the direct reward compared to the previous task performance and a new Q value is again determined. Eventually, with enough episodes, optimal actions are learned by the neural network. A similar deep Q network was applied in Alpha go where the neural network utilizing deep reinforcement learning was able to defeat a professional chess player.

Q value based reinforcement learning methods have also been applied to robots, and in particular robot navigation. FIG. 1 shows prior art neural network architecture utilized for robot navigation. In this model a control command is based on visual inputs and specifically the different scenes presented. Unfortunately, this architecture had a difficult time performing optimally. The trained model had little generalization and scene-specific layers need to be retrained for different scenes. The robot also used constant step lengths and turning angles again causing slow and unnatural movements. In addition, robots are typically desired to perform multiple functions or tasks where only navigation is contemplated by the architecture. Thus, if a second task is desired, implementing with neural network architecture shown in FIG. 1, a transition period would be required, again resulting in unnatural behaviors by the robot.

Thus, what is needed is a system for teaching a neural network using reinforcement learning that improves navigation task learning and that learns two tasks simultaneously. The system needs to facilitate navigation learning by independently training subnets of a Q network. The system also needs to facilitate navigation learning by combining subnets with multi-layer perceptron networks. The system also needs to provide smooth and continuous transitions between tasks by using a weight function that is assigned to each task such that both tasks are improved simultaneously. By enabling these features, the present system allows a neural network to increase the efficiency of learning a navigation task and simultaneously improve navigation and human interfacing tasks. Additional details and embodiments are described below.

Figure 2:
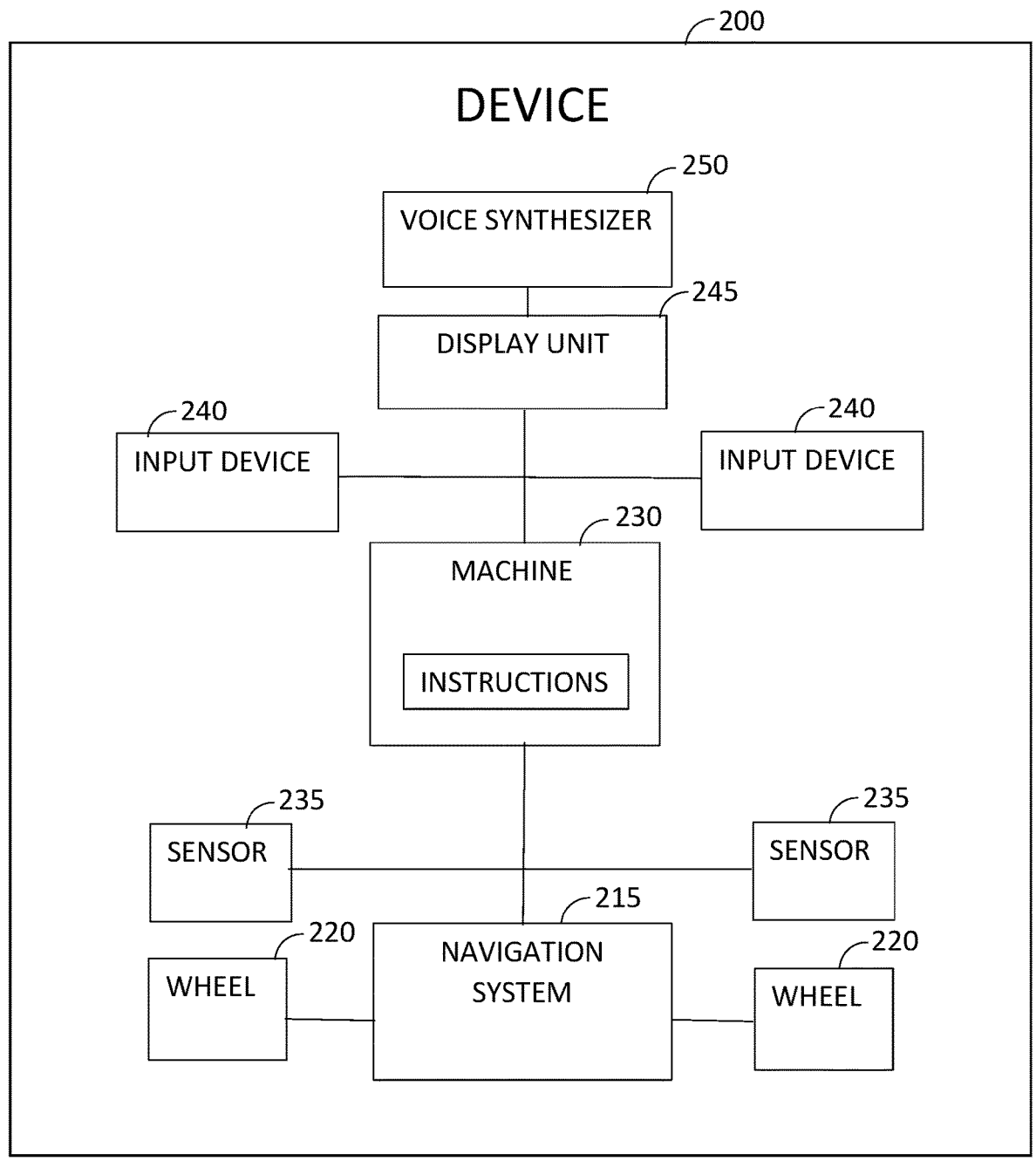
FIG. 2 is a block diagram of an example of a device having an artificial neural network, according to an embodiment.

FIG. 2 is an example of a device 200 having an artificial neural network that utilizes reinforcement learning. The device 200, such as a robot, has a body 210 and a navigation system 215. In an example, the device 200 includes wheels 220 and a suspension system 225 secured to and directing the wheels 220. Although a robot is presented here, the device 200 may be a vehicle, drone, or the like, that has a navigation system and may automatically traverse. Additionally, while the example describes the navigation system 215 having wheels 220, other means of transport, including but not limited to tracks, wings, or the like, may be used without falling outside the scope of this disclosure.

A machine 230 is provided that is connected (e.g., when in operation) with the navigation system 215 in order to direct the suspension system 225 of the device 200. The machine 230 may be considered a control system, computer system, or the like that is connected (networked) with other electrical devices and machines. Sensors 235 are also part of the device 200 and in communication to provide sensor data to the machine 230. The sensors 235 are located in any place where they are able to transmit data to the machine 230. This includes, but is not limited to on the body 210, in the body 210, remote to the body 210, or any other manner in which sensors are known to be coupled to the body 210. The sensors 235 may relay data of any type, including but not limited to object detection data, motion data, motion direction, speed data, acceleration data and the like. The sensors 235 may be of any type, including but not limited to a LADIR sensor, ultrasound sensor, red green and blue (RGB) sensor, depth image sensor, or the like.

One or more input devices 240 are also coupled to the body 210 in any manner as described above to provide additional input data to the machine 230. In an example, at least one input device 240 is a camera that continually records the scenery as the device transverses from a starting location to an ending location. Using the recorded scenery the machine determines both the direction of the device 200 and the change in direction of the device 200 as the device transverses. Thus, in this example the input device 240 continuously receives motion direction data to be used by the machine. In an example, the camera is a RGB digit camera or other high resolution camera. In another example, at least one input device 240 monitors actions of the device 205 related to social navigation to generate task related data. For example, the social navigation actions include a device facing a human, pro-actively greeting a human, or approaching a human while staying a socially acceptable distance from the human. In such examples, the device 205 may include a display unit 245 that is in communication with the machine 230 for providing written communication to a user. In another example the device 205 includes a voice synthesizer 250 that is also in communication with the machine 230 and orally communicates with a human.

Figure 3:
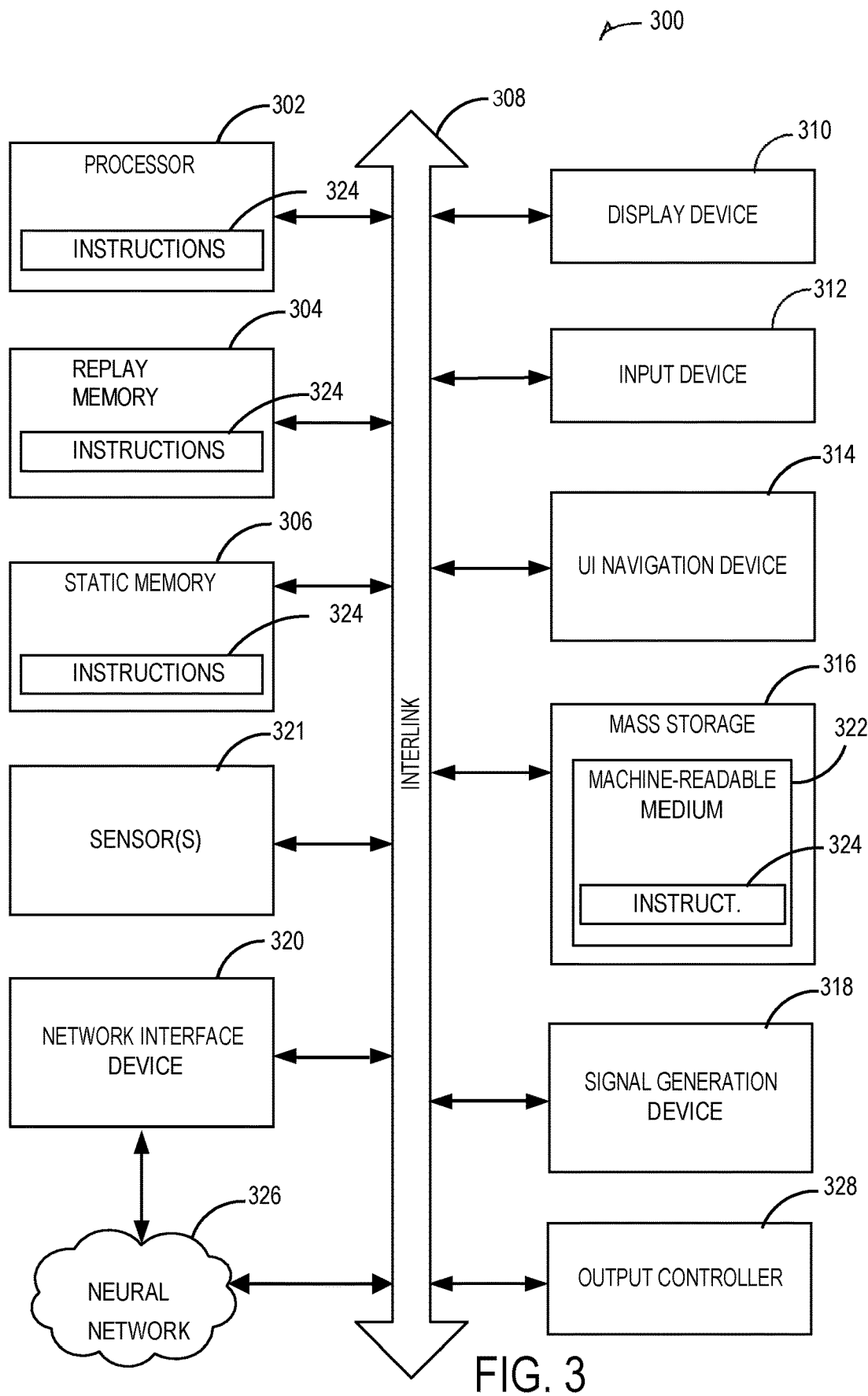
FIG. 3 is a block diagram illustrating an example of a machine upon which one or more embodiments may be implemented.

FIG. 3 illustrates a block diagram of an example machine 300 upon which any one or more of the techniques (e.g., methodologies) discussed herein may perform. In alternative embodiments, the machine 300 may operate as a standalone device or may be connected (e.g., networked) to other machines. In an example, the machine 300 may act as a peer machine in peer-to-peer (P2P) (or other distributed) network environment. The machine 300 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, engines, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 300 may include one or more hardware processors 302 (e.g., a central processing unit (CPU), a graphics processing unit (GPU), a hardware processor core, or any combination thereof), a main memory 304 and a replay or static memory 306, some or all of which may communicate with each other via an interlink (e.g., bus) 308. In an example, the machine 230 of the device 200 of FIG. 2 is machine 300 and the processor 302 is the processor for a neural network 309 that in an example has architecture as provided in the neural network 400 of FIG. 4. The machine 300 may further include a display unit 310 (wherein display unit 245 is an example thereof), an alphanumeric input device 312 (e.g., a keyboard, wherein input devices 240 of FIG. 2 are examples thereof), and a user interface (UI) navigation device 314 (e.g., a mouse). In an example, the display unit 310, input device 312 and UI navigation device 314 may be a touch screen display. The machine 300 may additionally include a storage device (e.g., drive unit) 316, a signal generation device 318 (e.g., a speaker, wherein voice module 250 is an example thereof), a network interface device 320, and one or more sensors 321, such as a global positioning system (GPS) sensor, compass, accelerometer, or other sensor (wherein the sensors 235 of FIG. 2 are examples thereof). The machine 300 may include an output controller 328, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 316 may include a machine readable medium 322 on which is stored one or more sets of data structures or instructions 324 (e.g., software) embodying or utilized by any one or more of the techniques or functions described herein. The instructions 324 may also reside, completely or at least partially, within the main memory 304, within static memory 306, or within the hardware processor 302 during execution thereof by the machine 300. In an example, one or any combination of the hardware processor 302, the main memory 304, the static memory 306, or the storage device 316 may constitute machine readable media.

While the machine readable medium 322 is illustrated as a single medium, the term "machine readable medium" may include a single medium or multiple media (e.g., a centralized or distributed database, and/or associated caches and servers) configured to store the one or more instructions 324.

The term "machine readable medium" may include any medium that is capable of storing, encoding, or carrying instructions for execution by the machine 300 and that cause the machine 300 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 324 may further be transmitted or received over a communications network 326 using a transmission medium via the network interface device 320 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 320 may include one or more physical jacks (e.g., Ethernet, coaxial, or phone jacks) or one or more antennas to connect to the communications network 326. In an example, the network interface device 320 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 300, and includes digital or analog communications signals or other intangible medium to facilitate communication of such software. The network 326 may also be a neural network that is also considered a functional module network, where the neural network is able to operate any and all of the systems described to make the machine fully autonomous.

Figure 4:
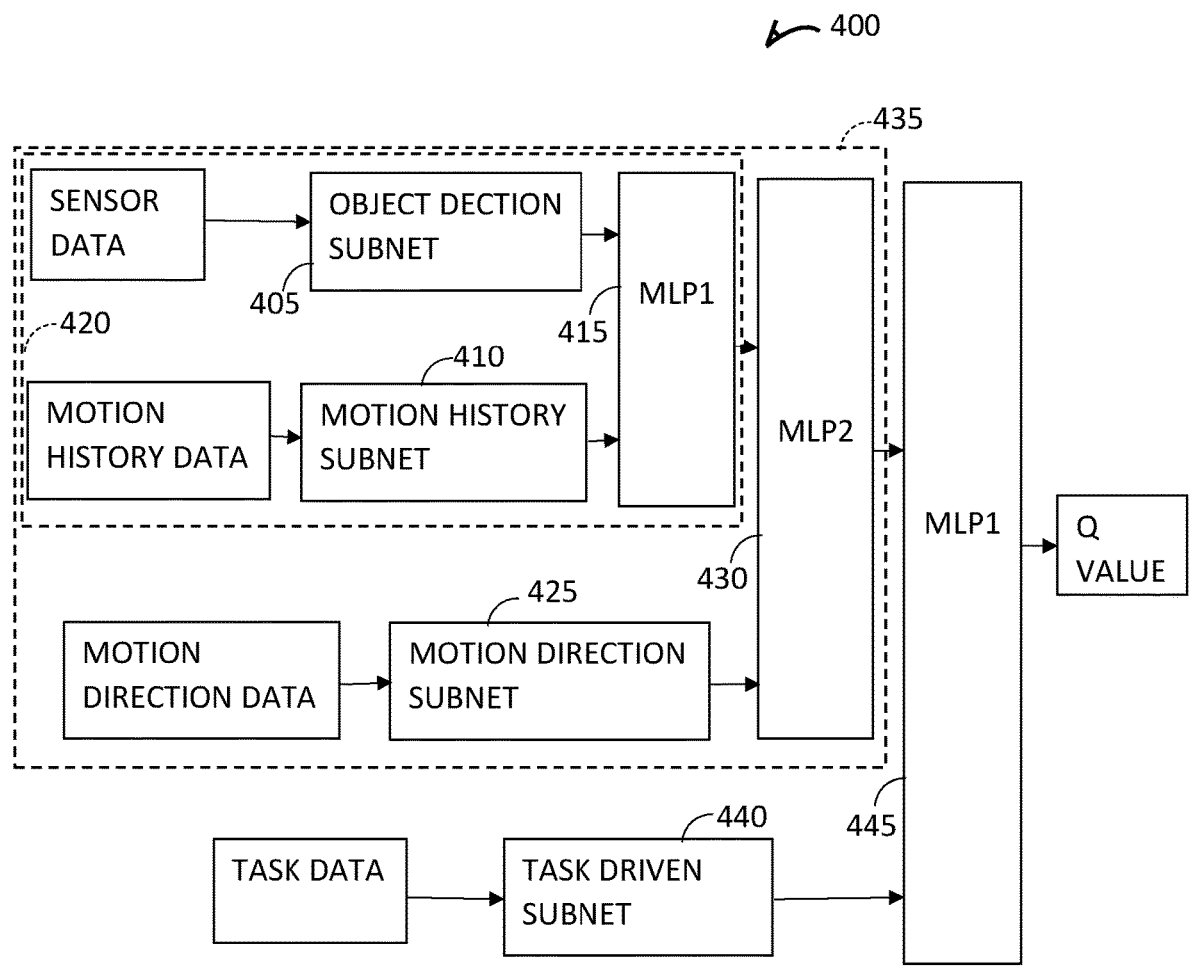
FIG. 4 is a block diagram illustrating an example of a neural network use to perform a method for teaching an artificial neural network through reinforcement learning, according to an embodiment.

FIG. 4 shows an example of architecture for a neural network 400 for teaching the neural network through reinforcement learning. Reinforcement learning is accomplished in that a device, such as a robot, having the neural network 400 performs various tasks during an episode that will be iteratively repeated over many episodes. In an example, in a first episode navigated by a device, a motion task is performed producing a first task result and an interaction task is preformed producing a second task result. The neural network accomplishes the first task result and second task result with a Q value with preset parameters. For example, the preset parameters may be random neural network weights. The illustrated architecture divides entire Q networks into several functional units connected with multi-layer perceptron (MLP) networks. Thus, after the episode is completed the neural network computes a Q value change (e.g., a new Q value) based on the series of random target actions. With this computed Q value change, the neural network calculates a direct reward and loss that are back propagated through the MLP networks to modify the parameters. The device then iteratively performs the motion task, interaction task, computes the Q value change, and modifies the MLP parameters in episodes of the navigation subsequent to the first episode. This allows the network 400 to be easily trained to handle multiple human related tasks by merely retraining the task-related parameters.

In an example, the neural network 400 (e.g., functional module Q network) is divided into several functional modules, each module with its own subnet. These subnets include an object detection subnet, a motion history subnet, a motion direction subnet, and target driven subnet. These subnets are connected via the MLP networks (e.g., MLP1 415, MLP2 430, and MLP3 445). Because each subnet has its own function, each is able to work alone, while others are able to combine results to form a more complex functional network. As an example, the object detection subnet, motion history subnet and first MLP may constitute an obstacle avoidance network. In another example, the formed obstacle avoidance network, a motion direction subnet and a second MLP are combined together to become a navigation network.

In an example, the subnets may be trained together or independently. Once trained, the networks may be applied to other tasks directly. Even when not completely trained, the networks may be applied to additional tasks because during operation the model parameters are continuously updated and optimized. Therefore, compared to traditional fully-connected networks, the dimension of model parameters easily converge causing a reduction in time for model training.

The neural network 400 includes an object detection subnet 405 that receives sensor data from one or more sensors of a device, including data related to the presence of objects in proximity to the device. The object detection subnet 405 has its own function and may work independently of other subnets.

The neural network 400 also includes a motion history subnet 410 that receives motion history based data from storage (replay memory). The motion history data includes the value and direction of both speed and acceleration as the device performs a motion task. By buffering the motion history data measurement noise is reduced and removed. In addition, the amount of space in a navigated environment is effectively decreased. The motion history subnet 410 has its own function and may work independently of other subnets.

The neural network 400 also includes an obstacle avoidance multi-layer perceptron (MLP) network 415. The obstacle avoidance MLP network 415 receives inputs and is connected to both the object detection subnet 405 and the motion history subnet 410. When connected, the object detection subnet 405, the motion history subnet 410, and the obstacle avoidance MLP network 415 form an obstacle avoidance network 420. The obstacle avoidance MLP network 415 has its own function and may work independently of other subnets. In an example, the obstacle avoidance MLP network 415 combines the subnets 405 and 410 to help the device to avoid obstacles. After completion of an episode, a direct reward and loss are calculated and the preset system parameters previously used are modified through back propagation of the obstacle avoidance MLP network 415 such that the modified parameters will be used in subsequent episode iterations.

The neural network 400 also includes a motion direction subnet 425 that receives motion direction data from a motion direction input device that in an example is a camera. The motion direction subnet 425 has its own function and may work independently of the other subnets.

The neural network 400 also includes a navigation MLP network 430. The navigation MLP network 430 receives inputs and is connected to both the object detection subnet 405 and the motion history subnet 410. When connected the obstacle avoidance MLP network 415, and the motion direction subnet 425 form a navigation network 435. The navigation network 435 has its own function and may work independently of other subnets. In an example, the navigation MLP network 430 makes causes the device to take random actions related to device navigation during an episode based on preset system parameters. After completion of an episode a direct reward and loss are calculated and the preset system parameters previously used are modified through back propagation of the MLP network 430 such that the modified parameters will be used in subsequent episode iterations.

The neural network 400 also includes a task driven subnet 440 that receives task data from one or more task input devices. The task driven subnet 440 obtains task-related data from the one or more inputs to guide the device to a predetermined destination. The task driven subnet has its own function and may work independently of the other subnets. In an example, the task-related data is related to robot (e.g. device) to human interaction. For example, the task-related data is related to the performance of the device facing a human. In another example, the task related data is related to the performance of the device pro-actively greeting a human. In yet another example, the task-related data is related to approaching a human while staying a socially acceptable distance from the human. In another example, the task-related data is related to following a human at a socially acceptable distance. For all of these examples, the neural network obtains task data, such as obstacle detection data, motion direction data, and motion history data for the local interactions between the device and human.

The neural network 400 also includes a task driven MLP network 445. The task driven MLP network 445 receives inputs and is connected to both the navigation MLP network 430 and the task driven subnet 440. When connected the navigation MLP network 435, the task driven subnet 440 and task driven MLP network 445 provide the Q value and Q value change for tasks performed by the device during the episode. In an example, the task driven MLP network 445 makes calculations and causes the device to take random actions related to robot (e.g. device) interaction with a human during an episode based on preset system parameters. After completion of an episode a direct reward and loss are calculated and the preset system parameters previously used are modified through back propagation of the MLP network 445 such that the modified parameters will be used in subsequent episode iterations. In an additional example, the task driven MLP network 445 provides a Q value that is used as a first task result weight related to a motion task and a second task result weight related to an interaction task for the episode. In the example the weights are provided based on the distance between the starting position of the device during the episode and the ending position of the device during the episode.

Figure 5:
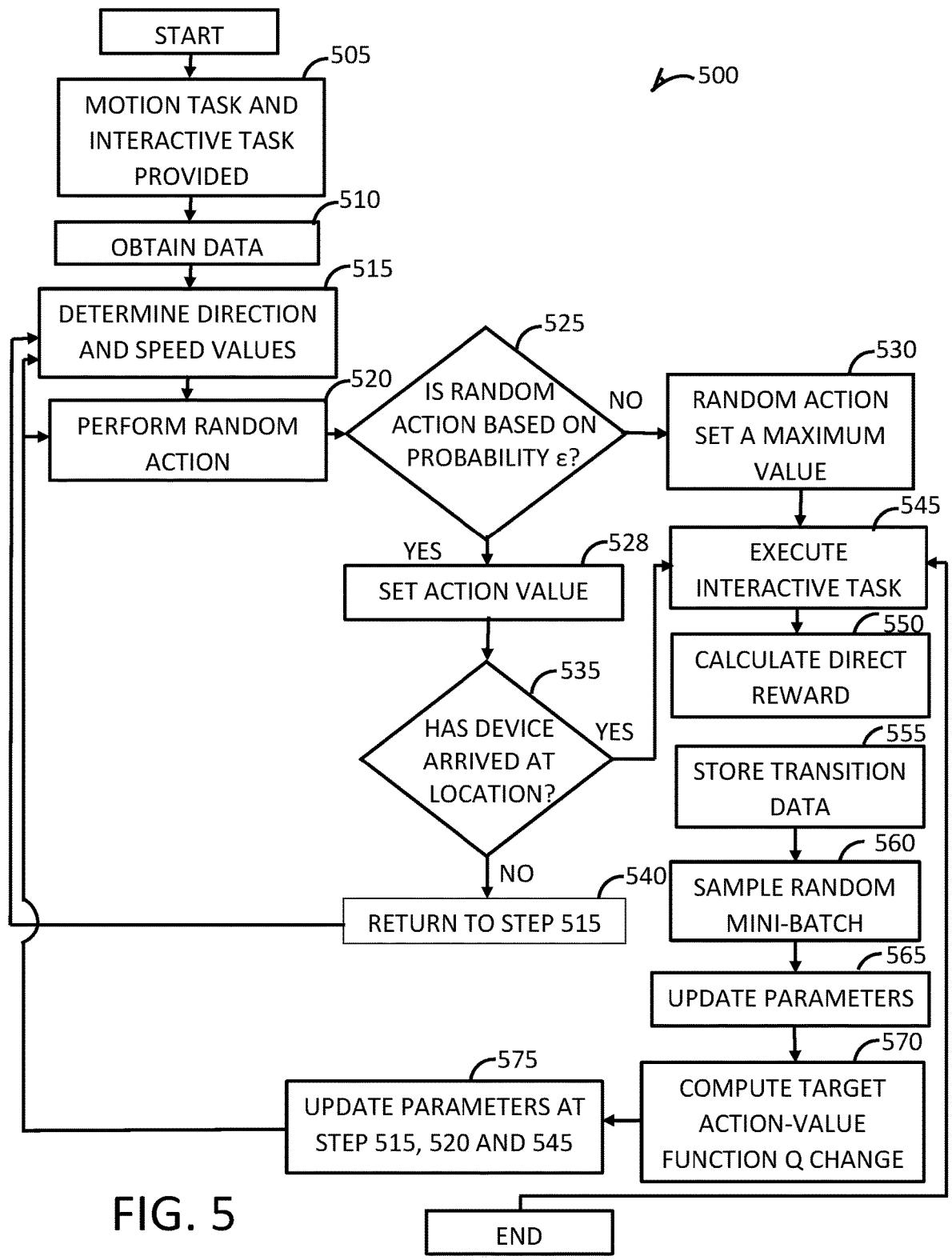
FIG. 5 illustrates a flow diagram of an example of a method for teaching an artificial neural network through reinforcement learning, according to an embodiment.

FIG. 5 illustrates a flow diagram of an example of a method 500 for teaching an artificial neural network using reinforcement learning. The operations of the method 500 are implemented in computer hardware, such as that described above or below (e.g. circuitry).

The operations of the method 500 show how the neural network of a device teaches itself how to accomplish tasks related to iterative episodes. For example, a motion task may be navigating through a room or rooms to get to an object or human, and an interaction task is interacting with the human. In an example, the parameters associated with the motion task and interaction task are all trained together. An e-greedy exploration is used based on experience replay. In particular, the state S=[L, MH, MD,T] is provided where: L is obstacle detection sensor data; MH is motion or action history data where values of direction and both speed and acceleration are represented in the motion or action history data. By buffering the motion history date measurement noise is reduced and removed while the space of the environment traversed is decreased for discrete action control; MD is motion direction data to guide the device a the second location and T is task-related data that guides the device to finish a human related task.

Once the episode is completed, the neural network evaluates actions or decisions made during the sequential decision making process and compares this to a sampling of previous episodes where the same tasks were undertaken. At this time a direct reward and loss are determined for the actions taken for the accomplished tasks. This direct reward may be a point value, or the like. The direct reward is used to adjust the neural network to achieve the optimum reward for each action undertaken when performing the tasks. Meanwhile, the loss, or loss function, determines where losses occurred during the actions undertaken during the tasks.

After the neural network calculates a direct reward and loss, reward signals and loss are back propagated through MLP networks for separate, multiple actions undertaken during the tasks. Using the reward signals and the loss function calculation, preset parameters, such as random weights, are modified for each subnet such that when the device performs a subsequent iteration of an episode, actions of the device during the subsequent iteration are altered to optimize the direct reward and minimize loss provided in each iteration. In this manner, the neural network not only is able to implement multiple tasks with smooth and continuous transitioning, but also improved navigation functionality. Thus, the multiple subnet architecture and direct reward and loss function described herein improve device navigation and human-device interaction simultaneously, continuously and robustly by learning from failure and success during tasks.

At operation 505 a device is placed at a starting location and provided a motion task of traversing to a target (e.g., object or human) at an ending location and an interactive task of interacting with the target.

At operation 510, one or more processors of a neural network of a device obtains (e.g., retrieves or receives) data. In an example, data obtained includes object detection data obtained from an object detection sensor, historical motion data obtained from the replay memory, or motion direction data obtained from motion direction input device.

At operation 515, the processor determines a direction and a speed values to transverse based on the data obtained. In an example, the replay memory is initialized and an action-value function Q with N(0,1) random weights $\Theta$ is provided. The random weights $\Theta$ are parameters with preset values based on previous episodes of the device traversing to the second location. In this manner, while the random weights are considered random for the step being taken during the episode, the random weights $\Theta$ are not random in relationship to the iterative episodes. In other words, the random weights $\Theta$ are continually modified based on data received to optimize the actions of the device. So, the random weights $\Theta$ are modified over time as iterations of the episode continually occur based on data obtained throughout each previous episode. Specifically, a target action-value function Q' with N(0,1) random weights $\Theta'$ is initialized based on the preset action-value function Q and weights $\Theta$. In this example, for the episode, a first state $S_1$ is initialized where the motion history actions are static actions.

At operation 520, the device performs a random action $a_t$ to traverse an environment based on the determination of operation 515. During this time, the processor of the neural network continues to receive input data from the sensors, replay memory, and input devices.

At decision 525, the processor determines if the random action $a_t$ selected by the device is based on a probability $\epsilon$. If yes, then the action value is set at operation 528 and the processor continues to decision 535.

At operation 530, if the random action $a_t$ was not selected based on a probability $\epsilon$, then the random action $a_t$ is set as a maximum value where $a_t=\mathrm{argmax}_a(Q(s_t, a; \Theta))$ and the process continues to decision 535.

At decision 535, the processor determines if the device has arrived at the end location.

At operation 540, if the device has not arrived at the end location, the processor returns to operation 515 to continuously determine direction and speed of the device to traverse to the second location.

At operation 545, if the device has arrived at the end location at decision 535, the processor executes the interaction task. In an example, the interactive task is provided at an emulator and requires interaction between the emulator and device.

Figure 6:
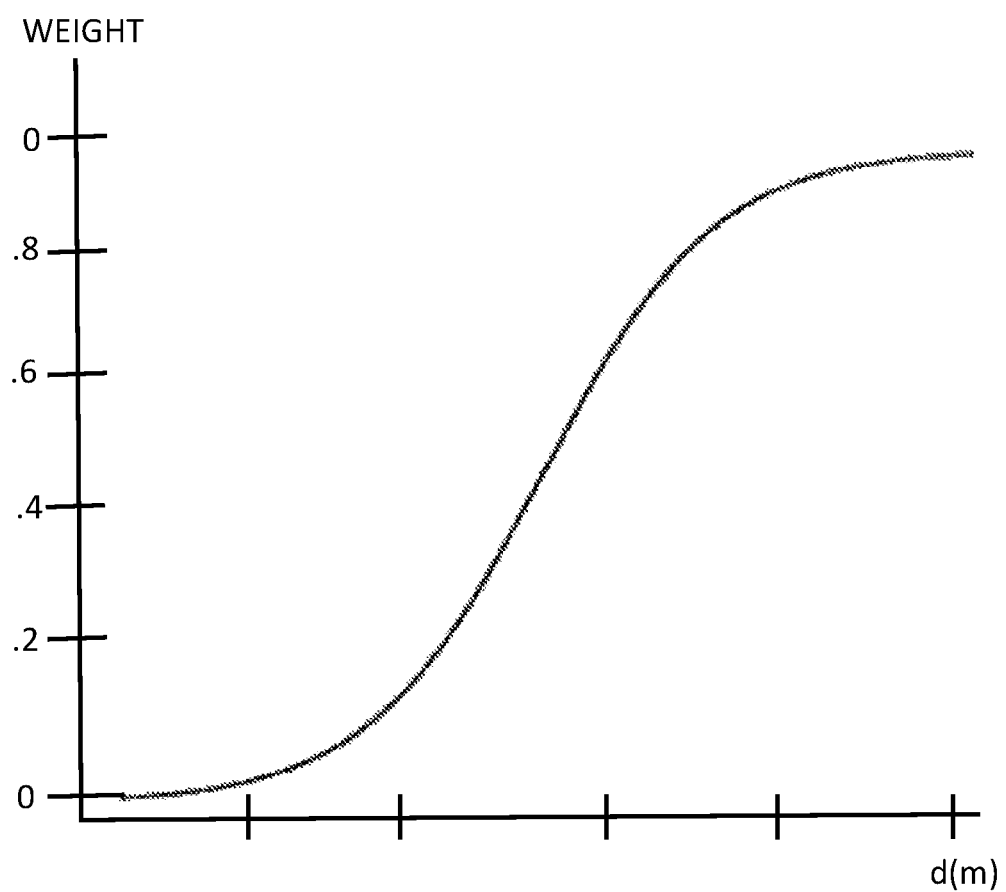
FIG. 6 is a graph of a weight function for a direct reward for first and second tasks, according to an embodiment.

At operation 550, the processor calculates a direct reward $r_t$ and second state $S_{t+1}$. In an example, the direct reward $r_t$ is determined by using the weight function shown in FIG. 6 to assign value to the motion task and interaction task. Thus, the direct reward is $r=f(d)*r1+(1-f(d))*r2$ where r1 is the reward for moving to the target (motion task) and r2 is the reward for interaction with the target (interaction task). In this example, if the device is far away from the target, the motion task has a high or increased weight, typically over 0.5. When the device is close to the subject, the interaction task has a high weight, or above 0.5. This weight determination and distance are pre-set parameters where the weight is automatically calculated by the processor of the device.

At operation 555, the processor stores the transition data $(S_t, a_t, S_{t+1}, r_t)$ of the episode in the replay memory.

At operation 560, the processor samples random mini-batch transition data $(S_t, a_t, S_{t+1}, r_t)$ from the replay memory of other episodes. In an example, the processor sets $y_i = r_t + \Upsilon *^{max}_a Q'(S_{i+1}, a; \Theta')$ as a result of the mini-batch sampling.

At operation 565, the processer updates parameters such as random weight $\Theta$. In an example, random weight $\Theta$ is estimated by iteratively minimizing the loss function with a Bellman equation where $L=L1+w_1*L2$ where L1 is the Q value loss function of the mini-batch samples and calculated using the Bellman equation: $L1=\Sigma(f(y_i)-f(Q(Si, a_i, \Theta)))^2$, where f is a robust function that limits the upper boundary of the difference, that in an example is a sigmoid function, and where L2 is the I2-norm of random weight $\Theta$ and $W_1$ is a small constant value.

At operation 570, the processor computes the target action-value function Q change.

At operation 575, the processor updates operation 515 by modifying parameters or weights $\Theta$. In an example, the target action-value function parameter, and specifically random weight $\Theta'$ is updated using the following equation: $\Theta'=\tau*\Theta'+(1-\tau)*\Theta$, where $\tau$ is a constant and $\Theta'$ a random weight associated with operations 515, 520 and 545. In this manner, the target action-value function Q is updated for each training episode instead of after a given amount of actions.

Figure 7A:
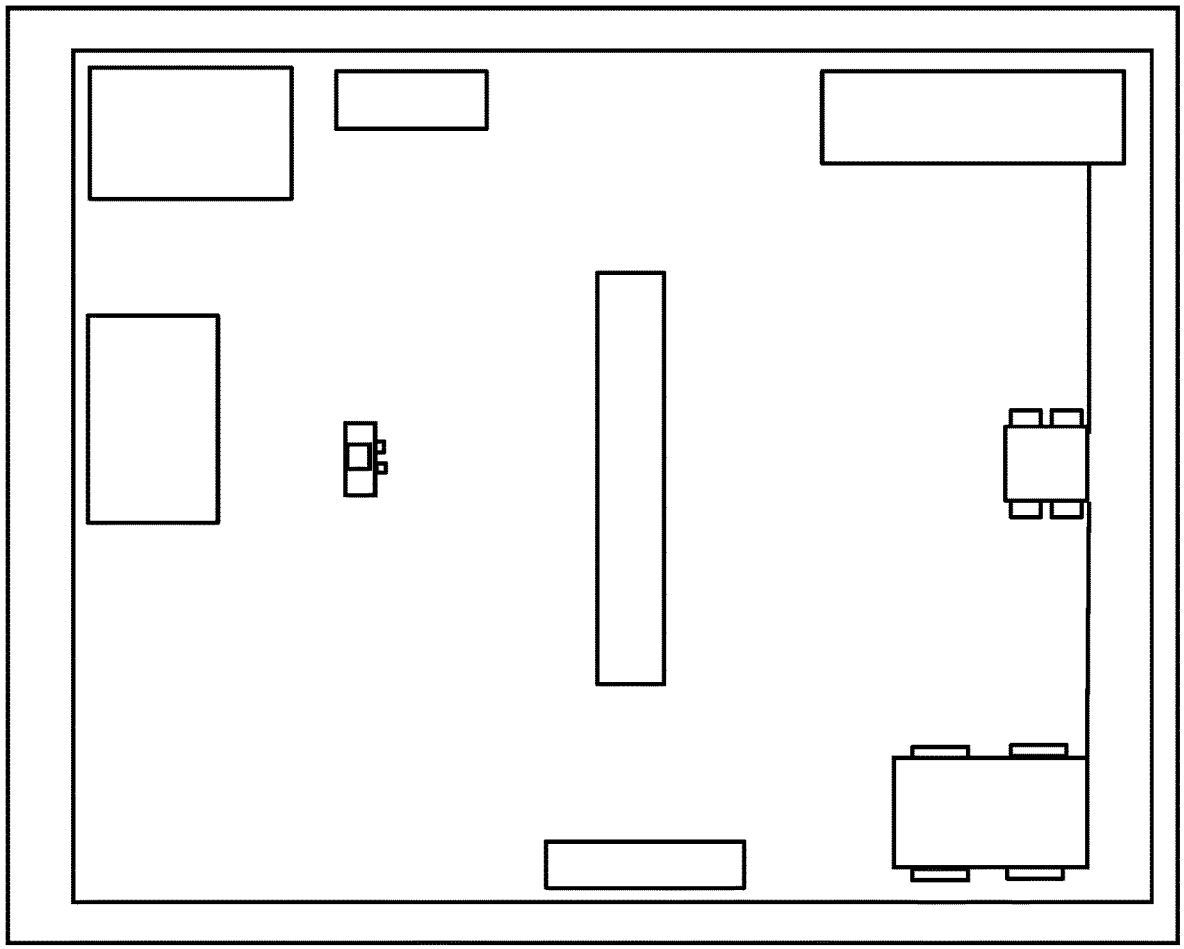
FIG. 7A is a plan top view illustrating an example of a machine navigating a space, according to an environment, according to an embodiment.
Figure 7B:
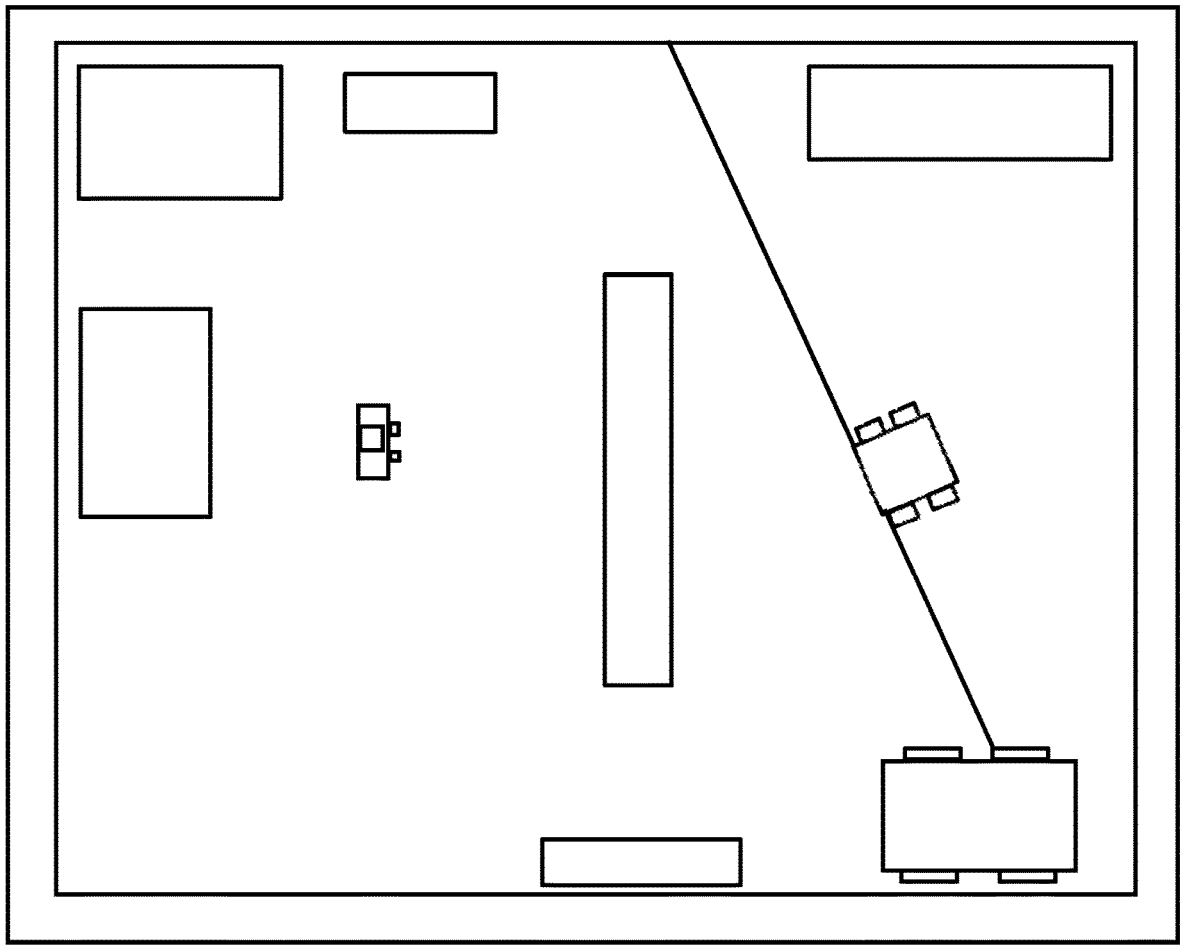
FIG. 7B is a plan top view illustrating an example of a machine navigating a space, according to an environment, according to an embodiment.
Figure 7C:
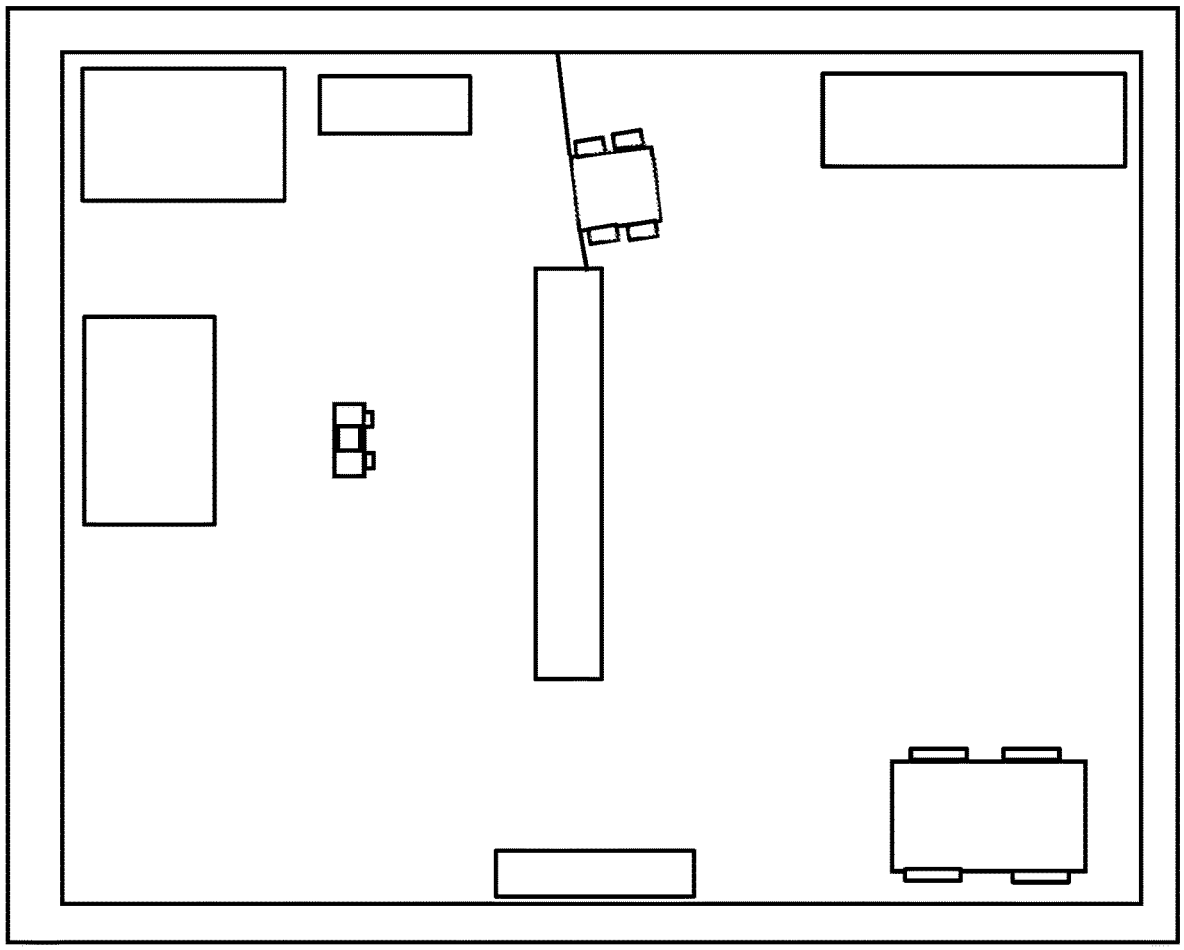
FIG. 7C is a plan top view illustrating an example of a machine navigating a space, according to an environment, according to an embodiment.
Figure 7D:
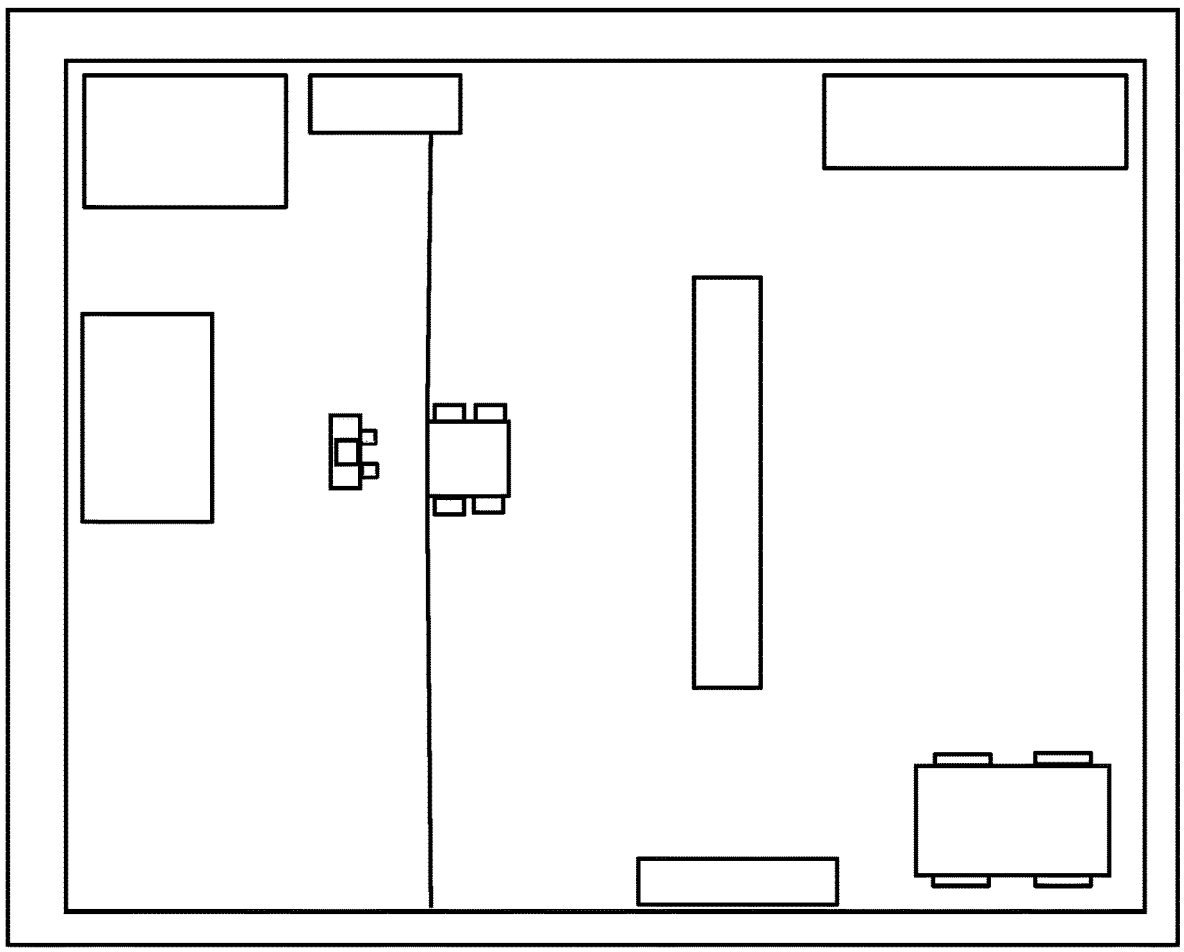
FIG. 7D is a plan top view illustrating an example of a machine navigating a space, according to an environment, according to an embodiment.

FIGS. 7A-7D show an example of an episode with a robot 700 traversing from a starting location in a room to an ending location where an object representing a human is located. The room is provided with multiple obstacles, including but not limited to tables, desks, sofa, light, chair, short wall, plant, computer and the like. The distance to the human is approximately 1-7 meters, with human rotation angle evenly distributed between 0-360° and the robot rotation angle evenly distributed between 0-360°. In FIG. 7A., the robot starts facing a back wall at one end of the room and must avoid the short wall presented in the middle of the room. As data is obtained from the object detection sensors, replay memory and motion direction sensors, by action 8 of the episode shown in FIG. 7B the robot is facing the correct direction and approaching the short wall. By action 22 of the episode shown in FIG. 7C the robot has navigated around the short wall and by action 35 of the episode shown in FIG. 7D the robot has made it to the second position adjacent the object to perform the interaction task.

In this experiment, the input data obtained included 32D LIDAR sensor data after normalization at the obstacle detection subnet, the previous two action at the action history subnet, normalized distance and direction of the destination at the motion direction subnet and normalized facing angle difference at the target driven subnet. The output was the Q value of 5 actions: going forward, going left, going right, rotating left and rotating right with the maximal Q value being executed. Using four different inside environments the results showed a 93% robot success rate within 2× of the least step number. The average step number was approximately 1.7× of the minimum average steps to accomplish the navigation or motion task. This was a vast improvement over previous navigation methodologies using reinforcement learning methods that showed a 12× of the minimum average steps to accomplish the navigation task and the parameter number being approximately 57% less. In sum, with the same training episode number of five thousand episodes a ten (10) percent increase in success rate was accomplished compared to previous robot navigation methodologies utilizing reinforcement learning techniques. Thus, improved navigation and a smooth and continuous transition from the motion task to the interaction task are accomplished. In addition, during the experiment, when the robot to human optimal path distance was less than four (4) meters, the success rate was 99.6% and when greater than four (4) meter the success rate was still 88.5%.

Additional Notes & Examples

In Example 1 is a system for teaching an artificial neural network using reinforcement learning. The system includes a computer readable medium including instructions; and one or more processors that, when the instructions are executed, is configured to perform a motion task to produce a first result, the motion task corresponding to navigating a device during a first episode, the motion task performed by a first multi-layer perceptron (MLP); perform an interaction task to produce a second result during navigation of the first episode; compute a Q value change from the first task result and the second task result using a second MLP; modify parameters of the first MLP and the second MLP based on the Q value change; and iteratively perform the motion task, the interaction task, computing the Q value change, and modifying parameters of the first MLP and the second MLP on episodes of the navigation subsequent to the first episode.

In Example 2, the subject matter of Example 1 optionally includes wherein transition between the motion task and interaction task is continuous.

In Example 3, the subject matter of any one or more of Examples 1-2 optionally include wherein the first MLP is coupled to an object detection subnet and a motion history subnet to form an obstacle avoidance network.

In Example 4, the subject matter of Example 3 optionally includes wherein the object detection subnet obtains object detection data from one or more sensors coupled to the device.

In Example 5, the subject matter of Example 4 optionally includes wherein at least one sensor is a LADIR sensor.

In Example 6, the subject matter of any one or more of Example 4 optionally include wherein at least one sensor is an ultrasound sensor.

In Example 7, the subject matter of any one or more of Example 4 optionally include wherein at least one sensor is an RGB sensor.

In Example 8, the subject matter of any one or more of Example 4 optionally include wherein at least one sensor is a depth image sensor.

In Example 9, the subject matter of any one or more of Examples 3-8 optionally include wherein the motion history subnet obtains motion history data from a replay memory of the device.

In Example 10, the subject matter of Example 9 optionally includes wherein the motion history data includes a value and direction of speed and acceleration to reduce noise in the motion history data.

In Example 11, the subject matter of any one or more of Examples 9-10 optionally include wherein the motion history data includes a value and direction of speed and acceleration to decrease parameter space in the motion history data.

In Example 12, the subject matter of any one or more of Examples 1-11 optionally include wherein the first MLP is coupled to an obstacle avoidance network and a motion direction subnet to form a navigation network.

In Example 13, the subject matter of Example 12 optionally includes wherein the obstacle avoidance network includes an object detection subnet, a motion history subnet and an obstacle avoidance MLP.

In Example 14, the subject matter of any one or more of Examples 12-13 optionally include wherein the motion direction subnet obtains motion direction data from an input to guide the device to a predetermined destination.

In Example 15, the subject matter of any one or more of Examples 1-14 optionally include wherein the second MLP is coupled to the first MLP and a task driven subnet.

In Example 16, the subject matter of Example 15 optionally includes wherein the task driven subnet obtains task-related data from an input to guide the device to perform the interaction task.

In Example 17, the subject matter of Example 16 optionally includes the system Example 16 wherein the interaction task is a human related task.

In Example 18, the subject matter of any one or more of Examples 1-17 optionally include wherein the device is a robot.

In Example 19, the subject matter of any one or more of Examples 1-18 optionally include wherein the second MLP provides a first task result weight and a second task result weight when computing the Q value change.

In Example 20, the subject matter of Example 19 optionally includes wherein the first task result weight and second task result weight is based on a distance between a starting position of the device and an ending position of the device during the first episode.

In Example 21, the subject matter of any one or more of Examples 1-20 optionally include wherein the method further comprises computing a direct reward based on the Q value change.

In Example 22, the subject matter of Example 21 optionally wherein the direct reward is computed using the equation $r=f(d)*r1+(1-f(d))*r2$ where r1 is a first task reward based on the motion task, r2 is the second task reward based on the interaction task and f(d) is a weight function.

In Example 23, the subject matter of Example 22 optionally includes wherein a direct reward signal is back propagated to the first MLP and second MLP based on the computed direct reward to modify the parameters of the first MLP and second MLP.

In Example 24, the subject matter of any one or more of Examples 1-23 optionally include wherein the motion task and the interaction task are performed based on an initial Q value and initial random weights $\Theta$ associated with the initial Q value.

In Example 25, the subject matter of Example 24 optionally includes computing a loss based on the Q value change to compute revised random weights $\Theta'$.

In Example 26, the subject matter of Example 25 optionally includes wherein the revised random weights $\Theta'$ are based on a computed direct reward and the computed loss.

In Example 27, the subject matter of any one or more of Examples 25-26 optionally wherein the loss is computed using the equation $L=L1+w_1*L2$ where L is loss, L1 is a Q value loss function of a random mini-batch of episode data, $w_1$ is a constant and L2 is the l2-norm of $\Theta$.

In Example 28, the subject matter of Example 27 optionally includes wherein $L1=\Sigma(f(y_i)-f(Q(S_i, a_i, \Theta)))^2$, where f is a robust function.

In Example 29, the subject matter of Example 28 optionally includes wherein the robust function is a sigmoid function.

In Example 30, the subject matter of any one or more of Examples 24-29 optionally includes wherein based on the initial random weights $\Theta$ an initial first state $S_t$ for the episode is provided where a random action at is selected with a probability $\epsilon$.

In Example 31, the subject matter of any one or more of Examples 24-30 optionally include wherein based on the initial random weights $\Theta$ an initial first state $S_t$ for the episode is provided where a random action $a_t=\mathrm{argmax}_a(Q(s_t, a; \Theta))$.

In Example 32, the subject matter of any one or more of Examples 30-31 optionally include wherein after the first task result and second task result are calculated, calculating a direct reward $r_t$ and second state $S_{t+1}$.

In Example 33, the subject matter of Example 32 optionally includes storing transitions $(S_t, a_t, S_{t+1}, r_t)$ in a replay memory.

In Example 34, the subject matter of Example 33 optionally includes sampling a random mini-batch of transitions $(S_t, a_t, S_{t+1}, r_t)$ from other episodes from the replay memory to set $y_i=r_t+\gamma^{*max}{}_a Q'(S_{i+1}, a; \Theta')$.

In Example 35, the subject matter of Example 34 optionally includes updating the random weight $\Theta$ by minimizing loss as a function of $y_i$.

In Example 36, the subject matter of any one or more of Examples 34-35 optionally include calculating a revised random weight $\Theta'$ using the function $\Theta'=\tau*\Theta'+(1-\tau)*\Theta$, where $\tau$ is a constant.

In Example 37, the subject matter of any one or more of Examples 1-36 optionally include wherein the Q value change is computed using an e-greedy exploration function.

In Example 38, the subject matter of any one or more of Examples 1-37 optionally include wherein the modified parameters are random weights $\Theta$.

Example 39 is a method for teaching an artificial neural network using reinforcement learning. The method includes performing a motion task to produce a first result, the motion task corresponding to navigating a device during a first episode, the motion task performed by a first multi-layer perceptron (MLP); performing an interaction task to produce a second result during navigation of the first episode; computing a Q value change from the first task result and the second task result using a second MLP; modifying parameters of the first MLP and the second MLP based on the Q value change; and iteratively performing the motion task, the interaction task, computing the Q value change, and modifying parameters of the first MLP and the second MLP on episodes of the navigation subsequent to the first episode.

In Example 40, the subject matter of Example 39 optionally includes wherein transition between the motion task and interaction task is continuous.

In Example 41, the subject matter of any one or more of Examples 39-40 optionally include wherein the first MLP is coupled to an object detection subnet and a motion history subnet to form an obstacle avoidance network.

In Example 42, the subject matter of Example 41 optionally includes wherein the object detection subnet obtains object detection data from one or more sensors coupled to the device.

In Example 43, the subject matter of Example 42 optionally includes wherein at least one sensor is a LADIR sensor.

In Example 44, the subject matter of any one or more of Examples 42 optionally include wherein at least one sensor is an ultrasound sensor.

In Example 45, the subject matter of any one or more of Examples 42 optionally include wherein at least one sensor is an RGB sensor.

In Example 46, the subject matter of any one or more of Examples 42 optionally include wherein at least one sensor is a depth image sensor.

In Example 47, the subject matter of any one or more of Examples 41 optionally include wherein the motion history subnet obtains motion history data from a replay memory of the device.

In Example 48, the subject matter of Example 47 optionally includes wherein the motion history data includes a value and direction of speed and acceleration to reduce noise in the motion history data.

In Example 49, the subject matter of any one or more of Examples 47-48 optionally include wherein the motion history data includes a value and direction of speed and acceleration to decrease parameter space in the motion history data.

In Example 50, the subject matter of any one or more of Examples 39-49 optionally include wherein the first MLP is coupled to an obstacle avoidance network and a motion direction subnet to form a navigation network.

In Example 51, the subject matter of Example 50 optionally includes wherein the obstacle avoidance network includes an object detection subnet, a motion history subnet and an obstacle avoidance MLP.

In Example 52, the subject matter of any one or more of Examples 50-51 optionally include wherein the motion direction subnet obtains motion direction data from an input to guide the device to a predetermined destination.

In Example 53, the subject matter of any one or more of Examples 39-52 optionally include wherein the second MLP is coupled to the first MLP and a task driven subnet.

In Example 54, the subject matter of Example 53 optionally includes wherein the task driven subnet obtains task-related data from an input to guide the device to perform the interaction task.

In Example 55, the subject matter of Example 54 optionally includes The method Example 54 wherein the interaction task is a human related task.

In Example 56, the subject matter of any one or more of Examples 39-55 optionally include wherein the device is a robot.

In Example 57, the subject matter of any one or more of Examples 39-56 optionally include wherein the second MLP provides a first task result weight and a second task result weight when computing the Q value change.

In Example 58, the subject matter of Example 57 optionally includes wherein the first task result weight and second task result weight is based on a distance between a starting position of the device and an ending position of the device during the first episode.

In Example 59, the subject matter of any one or more of Examples 39-58 optionally include wherein the method further comprises computing a direct reward based on the Q value change.

In Example 60, the subject matter of Example 59 optionally includes wherein the direct reward is computed using the equation r=f(d)*r1+(1−f(d))*r2 where r1 is a first task reward based on the motion task, r2 is the second task reward based on the interaction task and f(d) is a weight function.

In Example 61, the subject matter of Example 60 optionally includes wherein a direct reward signal is back propagated to the first MLP and second MLP based on the computed direct reward to modify the parameters of the first MLP and second MLP.

In Example 62, the subject matter of any one or more of Examples 39-61 optionally include wherein the motion task and the interaction task are performed based on an initial Q value and initial random weights $\Theta$ associated with the initial Q value.

In Example 63, the subject matter of Example 62 optionally includes computing a loss based on the Q value change to compute revised random weights $\Theta'$.

In Example 64, the subject matter of Example 63 optionally includes wherein the revised random weights $\Theta'$ are based on a computed direct reward and the computed loss.

In Example 65, the subject matter of any one or more of Examples 63-64 optionally include wherein the loss is computed using the equation L=L1+$w_1$*L2 where L is loss, L1 is a Q value loss function of a random mini-batch of episode data, $W_1$ is a constant and L2 is the l2-norm of $\Theta$.

In Example 66, the subject matter of Example 65 optionally includes wherein L1=$\Sigma(f(y_i)-f(Q(Si, a_i, \Theta)))^2$, where f is a robust function.

In Example 67, the subject matter of Example 66 optionally includes wherein the robust function is a sigmoid function.

In Example 68, the subject matter of any one or more of Examples 62-67 optionally include wherein based on the initial random weights $\Theta$ an initial first state $S_t$ for the episode is provided where a random action $a_t$ is selected with a probability $\epsilon$.

In Example 69, the subject matter of any one or more of Examples 62-68 optionally include wherein based on the initial random weights $\Theta$ an initial first state $S_t$ for the episode is provided where a random action $a_t$=argmax$_a$(Q($s_t$, a; $\Theta$)).

In Example 70, the subject matter of any one or more of Examples 68-69 optionally include wherein after the first task result and second task result are calculated, calculating a direct reward $r_t$ and second state $S_{t+1}$.

In Example 71, the subject matter of Example 70 optionally includes storing transitions ($S_t$, $a_t$, $S_{t+1}$, $r_t$) in a replay memory.

In Example 72, the subject matter of Example 71 optionally includes sampling a random mini-batch of transitions ($S_t$, $a_t$, $S_{t+1}$, $r_t$) from other episodes from the replay memory to set $y_i$=$r_i$+$\Upsilon$ *$^{max}_a$Q'($S_{i+1}$, a; $\Theta$').

In Example 73, the subject matter of Example 72 optionally includes updating the random weight $\Theta$ by minimizing loss as a function of $y_i$.

In Example 74, the subject matter of any one or more of Examples 72-73 optionally include calculating a revised random weight $\Theta'$ using the function $\Theta'=\tau*\Theta'+(1-\tau)*\Theta$, where $\tau$ is a constant.

In Example 75, the subject matter of any one or more of Examples 39-74 optionally include wherein the Q value change is computed using an e-greedy exploration function.

In Example 76, the subject matter of any one or more of Examples 39-75 optionally include wherein the modified parameters are random weights $\Theta$.

Example 77 is a system comprising means to perform any of the methods 39-76.

Example 78 is at least one machine readable medium including instructions that, when executed by a machine, cause the machine to perform any of the methods 39-76.

Example 79 is at least one machine readable medium including instructions for teaching an artificial neural network using reinforcement learning, the instructions, when executed by a machine, cause the machine to perform operations comprising: perform a motion task to produce a first result, the motion task corresponding to navigating a device during a first episode, the motion task performed by a first multi-layer perceptron (MLP); perform an interaction task to produce a second result during navigation of the first episode; compute a Q value change from the first task result and the second task result using a second MLP; modify parameters of the first MLP and the second MLP based on the Q value change; and iteratively perform the motion task, the interaction task, computing the Q value change, and modifying parameters of the first MLP and the second MLP on episodes of the navigation subsequent to the first episode.

In Example 80, the subject matter of Example 79 optionally includes wherein transition between the motion task and interaction task is continuous.

In Example 81, the subject matter of any one or more of Examples 79-80 optionally include wherein the first MLP is coupled to an object detection subnet and a motion history subnet to form an obstacle avoidance network.

In Example 82, the subject matter of Example 81 optionally includes wherein the object detection subnet obtains object detection data from one or more sensors coupled to the device.

In Example 83, the subject matter of Example 82 optionally includes wherein at least one sensor is a LADIR sensor.

In Example 84, the subject matter of any one or more of Examples 82 optionally include wherein at least one sensor is an ultrasound sensor.

In Example 85, the subject matter of any one or more of Examples 82 optionally include wherein at least one sensor is an RGB sensor.

In Example 86, the subject matter of any one or more of Examples 82 optionally include wherein at least one sensor is a depth image sensor.

In Example 87, the subject matter of any one or more of Examples 81 optionally include wherein the motion history subnet obtains motion history data from a replay memory of the device.

In Example 88, the subject matter of Example 87 optionally includes wherein the motion history data includes a value and direction of speed and acceleration to reduce noise in the motion history data.

In Example 89, the subject matter of any one or more of Examples 87-88 optionally include wherein the motion history data includes a value and direction of speed and acceleration to decrease parameter space in the motion history data.

In Example 90, the subject matter of any one or more of Examples 79-89 optionally include wherein the first MLP is coupled to an obstacle avoidance network and a motion direction subnet to form a navigation network.

In Example 91, the subject matter of Example 90 optionally includes wherein the obstacle avoidance network includes an object detection subnet, a motion history subnet and an obstacle avoidance MLP.

In Example 92, the subject matter of any one or more of Examples 90-91 optionally include wherein the motion direction subnet obtains motion direction data from an input to guide the device to a predetermined destination.

In Example 93, the subject matter of any one or more of Examples 79-92 optionally include wherein the second MLP is coupled to the first MLP and a task driven subnet.

In Example 94, the subject matter of Example 93 optionally includes wherein the task driven subnet obtains task-related data from an input to guide the device to perform the interaction task.

In Example 95, the subject matter of Example 94 optionally includes wherein the interaction task is a human related task.

In Example 96, the subject matter of any one or more of Examples 79-95 optionally include wherein the device is a robot.

In Example 97, the subject matter of any one or more of Examples 79-96 optionally include wherein the second MLP provides a first task result weight and a second task result weight when computing the Q value change.

In Example 98, the subject matter of Example 97 optionally includes wherein the first task result weight and second task result weight is based on a distance between a starting position of the device and an ending position of the device during the first episode.

In Example 99, the subject matter of any one or more of Examples 79-98 optionally include wherein the method further comprises computing a direct reward based on the Q value change.

In Example 100, the subject matter of Example 99 optionally includes wherein the direct reward is computed using the equation $r=f(d)*r1+(1-f(d))*r2$ where r1 is a first task reward based on the motion task, r2 is the second task reward based on the interaction task and f(d) is a weight function.

In Example 101, the subject matter of Example 100 optionally includes wherein a direct reward signal is back propagated to the first MLP and second MLP based on the computed direct reward to modify the parameters of the first MLP and second MLP.

In Example 102, the subject matter of any one or more of Examples 79-101 optionally include wherein the motion task and the interaction task are performed based on an initial Q value and initial random weights $\Theta$ associated with the initial Q value.

In Example 103, the subject matter of Example 102 optionally includes computing a loss based on the Q value change to compute revised random weights $\Theta'$.

In Example 104, the subject matter of Example 103 optionally includes wherein the revised random weights $\Theta'$ are based on a computed direct reward and the computed loss.

In Example 105, the subject matter of any one or more of Examples 103-104 optionally include wherein the loss is computed using the equation $L=L1+w_1*L2$ where L is loss, L1 is a Q value loss function of a random mini-batch of episode data, $w_1$ is a constant and L2 is the l2-norm of $\Theta$.

In Example 106, the subject matter of Example 105 optionally includes wherein $L1=\Sigma(f(y_i)-f(Q(Si, a_i, \Theta)))^2$, where f is a robust function.

In Example 107, the subject matter of Example 106 optionally includes wherein the robust function is a sigmoid function.

In Example 108, the subject matter of any one or more of Examples 102-107 optionally include wherein based on the initial random weights $\Theta$ an initial first state $S_t$ for the episode is provided where a random action at is selected with a probability $\epsilon$.

In Example 109, the subject matter of any one or more of Examples 102-108 optionally include wherein based on the initial random weights $\Theta$ an initial first state $S_t$ for the episode is provided where a random action $a_t=\text{argmax}_a(Q(s_t, a; \Theta))$.

In Example 110, the subject matter of any one or more of Examples 108-109 optionally include wherein after the first task result and second task result are calculated, calculating a direct reward $r_t$ and second state $S_{t+1}$.

In Example 111, the subject matter of Example 110 optionally includes storing transitions $(S_t, a_t, S_{t+1}, r_t)$ in a replay memory.

In Example 112, the subject matter of Example 111 optionally includes sampling a random mini-batch of transitions $(S_t, a_t, S_{t+1}, r_t)$ from other episodes from the replay memory to set $y_i=r_i+\Upsilon *^{max}_a Q'(S_{i+1}, a; \Theta')$.

In Example 113, the subject matter of Example 112 optionally includes updating the random weight $\Theta$ by minimizing loss as a function of $y_i$.

In Example 114, the subject matter of any one or more of Examples 112-113 optionally include calculating a revised random weight $\Theta'$ using the function $\Theta'=\tau*\Theta'+(1-\tau)*\Theta$, where $\tau$ is a constant.

In Example 115, the subject matter of any one or more of Examples 79-114 optionally include wherein the Q value change is computed using an e-greedy exploration function.

In Example 116, the subject matter of any one or more of Examples 79-115 optionally include wherein the modified parameters are random weights $\Theta$.

In Example 117 is an apparatus for teaching an artificial neural network using reinforcement learning. The apparatus includes a mean to perform a motion task to produce a first result, the motion task corresponding to navigating a device during a first episode, the motion task performed by a first multi-layer perceptron (MLP); means to perform an interaction task to produce a second result during navigation of the first episode; means to compute a Q value change from the first task result and the second task result using a second MLP; means to modify parameters of the first MLP and the second MLP based on the Q value change; and means to iteratively perform the motion task, the interaction task, computing the Q value change, and modifying parameters of the first MLP and the second MLP on episodes of the navigation subsequent to the first episode.

In Example 118, the subject matter of Example 117 optionally includes wherein transition between the motion task and interaction task is continuous.

In Example 119, the subject matter of any one or more of Examples 117-118 optionally include wherein the first MLP is coupled to an object detection subnet and a motion history subnet to form an obstacle avoidance network.

In Example 120, the subject matter of Example 119 optionally includes wherein the object detection subnet obtains object detection data from one or more sensors coupled to the device.

In Example 121, the subject matter of Example 120 optionally includes wherein at least one sensor is a LADIR sensor.

In Example 122, the subject matter of any one or more of Example 120 optionally include wherein at least one sensor is an ultrasound sensor.

In Example 123, the subject matter of any one or more of Example 120 optionally include wherein at least one sensor is an RGB sensor.

In Example 124, the subject matter of any one or more of Example 120 optionally include wherein at least one sensor is a depth image sensor.

In Example 125, the subject matter of any one or more of Examples 119-124 optionally include wherein the motion history subnet obtains motion history data from a replay memory of the device.

In Example 126, the subject matter of Example 125 optionally includes wherein the motion history data includes a value and direction of speed and acceleration to reduce noise in the motion history data.

In Example 127, the subject matter of any one or more of Examples 125-126 optionally include wherein the motion history data includes a value and direction of speed and acceleration to decrease parameter space in the motion history data.

In Example 128, the subject matter of any one or more of Examples 117-127 optionally include wherein the first MLP is coupled to an obstacle avoidance network and a motion direction subnet to form a navigation network.

In Example 129, the subject matter of Example 128 optionally includes wherein the obstacle avoidance network includes an object detection subnet, a motion history subnet and an obstacle avoidance MLP.

In Example 130, the subject matter of any one or more of Examples 128-129 optionally include wherein the motion direction subnet obtains motion direction data from an input to guide the device to a predetermined destination.

In Example 131, the subject matter of any one or more of Examples 117-130 optionally include wherein the second MLP is coupled to the first MLP and a task driven subnet.

In Example 132, the subject matter of Example 131 optionally includes wherein the task driven subnet obtains task-related data from an input to guide the device to perform the interaction task.

In Example 133, the subject matter of Example 132 optionally includes the apparatus Example 16 wherein the interaction task is a human related task.

In Example 134, the subject matter of any one or more of Examples 117-132 optionally include wherein the device is a robot.

In Example 135, the subject matter of any one or more of Examples 117-133 optionally include wherein the second MLP provides a first task result weight and a second task result weight when computing the Q value change.

In Example 136, the subject matter of Example 135 optionally includes wherein the first task result weight and second task result weight is based on a distance between a starting position of the device and an ending position of the device during the first episode.

In Example 137, the subject matter of any one or more of Examples 117-136 optionally include wherein the method further comprises computing a direct reward based on the Q value change.

In Example 138, the subject matter of Example 137 optionally wherein the direct reward is computed using the equation $r=f(d)*r1+(1-f(d))*r2$ where r1 is a first task reward based on the motion task, r2 is the second task reward based on the interaction task and f(d) is a weight function.

In Example 139, the subject matter of Example 138 optionally includes wherein a direct reward signal is back propagated to the first MLP and second MLP based on the computed direct reward to modify the parameters of the first MLP and second MLP.

In Example 140, the subject matter of any one or more of Examples 117-139 optionally include wherein the motion task and the interaction task are performed based on an initial Q value and initial random weights $\Theta$ associated with the initial Q value.

In Example 141, the subject matter of Example 140 optionally includes computing a loss based on the Q value change to compute revised random weights $\Theta'$.

In Example 142, the subject matter of Example 141 optionally includes wherein the revised random weights $\Theta'$ are based on a computed direct reward and the computed loss.

In Example 143, the subject matter of any one or more of Examples 141-142 optionally wherein the loss is computed using the equation $L=L1+w_1*L2$ where L is loss, L1 is a Q value loss function of a random mini-batch of episode data, $w_1$ is a constant and L2 is the l2-norm of $\Theta$.

In Example 144, the subject matter of Example 143 optionally includes wherein $L1=\Sigma(f(y_i)-f(Q(Si, a_i, \Theta)))^2$, where f is a robust function.

In Example 145, the subject matter of Example 144 optionally includes wherein the robust function is a sigmoid function.

In Example 146, the subject matter of any one or more of Examples 140-145 optionally include wherein based on the initial random weights $\Theta$ an initial first state $S_t$ for the episode is provided where a random action $a_t$ is selected with a probability $\epsilon$.

In Example 147, the subject matter of any one or more of Examples 140-146 optionally include wherein based on the initial random weights $\Theta$ an initial first state $S_t$ for the episode is provided where a random action $a_t=\mathrm{argmax}_a(Q(s_t, a; \Theta))$.

In Example 148, the subject matter of any one or more of Examples 146-147 optionally include wherein after the first task result and second task result are calculated, calculating a direct reward $r_t$ and second state $S_{t+1}$.

In Example 149, the subject matter of Example 148 optionally includes storing transitions ($S_t$, $a_t$, $S_{t+1}$, $r_t$) in a replay memory.

In Example 150, the subject matter of Example 149 optionally includes sampling a random mini-batch of transitions ($S_t$, $a_t$, $S_{t+1}$, $r_t$) from other episodes from the replay memory to set $y_i=r_t+\Upsilon*^{max}_a Q'(S_{t+1}, a; \Theta')$.

In Example 151, the subject matter of Example 150 optionally includes updating the random weight $\Theta$ by minimizing loss as a function of $y_i$.

In Example 152, the subject matter of any one or more of Examples 150-151 optionally include calculating a revised random weight $\Theta'$ using the function $\Theta'=\tau*\Theta'+(1-\tau)*\Theta$, where $\tau$ is a constant.

In Example 153, the subject matter of any one or more of Examples 117-152 optionally include wherein the Q value change is computed using an e-greedy exploration function.

In Example 154, the subject matter of any one or more of Examples 117-153 optionally include wherein the modified parameters are random weights $\Theta$.

In Example 155, the system comprises means to perform any method of examples 1-154.

In Example 156, at least one machine readable medium includes instructions that, when executed by a machine, cause the machine to perform of Examples 1-154.

In Example 157 is a system to implement of any of Examples 1-154.

In Example 158 is a method to implement of any of Examples 1-154.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for teaching an artificial neural network using reinforcement learning, the system comprising:
    a computer readable medium including instructions; and
    one or more processors that, when the instructions are executed, is configured to:
        perform a motion task to produce a first result, the motion task corresponding to navigating a device during a first episode, the motion task performed by a first multi-layer perceptron (MLP);
        perform an interaction task to produce a second result during navigation of the first episode;
        compute a Q value change from the first task result and the second task result using a second MLP;
        modify parameters of the first MLP and the second MLP based on the Q value change; and
        iteratively perform the motion task, the interaction task, computing the Q value change, and modifying parameters of the first MLP and the second MLP on episodes of the navigation subsequent to the first episode.

2. The system of claim 1 wherein transition between the motion task and interaction task is continuous.

3. The system of claim 1 wherein the first MLP is coupled to an object detection subnet and a motion history subnet to form an obstacle avoidance network.

4. The system of claim 3 wherein the motion history subnet obtains motion history data from a replay memory of the device.

5. The system of claim 1 wherein the first MLP is coupled to an obstacle avoidance network and a motion direction subnet to form a navigation network.

6. The system of claim 1 wherein the second MLP is coupled to the first MLP and a task driven subnet.

7. The system of claim 6 wherein the task driven subnet obtains task-related data from an input to guide the device to perform the interaction task.

8. The system of claim 1 wherein the second MLP provides a first task result weight and a second task result weight when computing the Q value change.

9. A method for caching an artificial neural network using reinforcement learning comprising:
    performing a motion task to produce a first result, the motion task corresponding to navigating a device during a first episode, the motion task performed by a first multi-layer perceptron (MLP);
    performing an interaction task to produce a second result during navigation of the first episode;
    computing a Q value change from the first task result and the second task result using a second MLP;
    modifying parameters of the first MLP and the second MLP based on the Q value change; and
    iteratively performing the motion task, the interaction task, computing the Q value change, and modifying parameters of the first MLP and the second MLP on episodes of the navigation subsequent to the first episode.

10. The method of claim 9 wherein transition between the motion task and interaction task is continuous.

11. The method of claim 9 wherein the first MLP is coupled to an object detection subnet and a motion history subnet to form an obstacle avoidance network.

12. The method of claim 11 wherein the motion history subnet obtains motion history data from a replay memory of the device.

13. The method of claim 9 wherein the first MLP is coupled to an obstacle avoidance network and a motion direction subnet to form a navigation network.

14. The method of claim 9 wherein the second MLP is coupled to the first MLP and a task driven subnet.

15. The method of claim 14 wherein the task driven subnet obtains task-related data from an input to guide the device to perform the interaction task.

16. The method of claim 9 wherein the second MLP provides a first task result weight and a second task result weight when computing the Q value change.

17. At least one non-transitory machine readable medium including instructions for teaching an artificial neural network using reinforcement learning, the instructions, when executed by a machine, cause the machine to perform operations comprising:

perform a motion task to produce a first result, the motion task corresponding to navigating a device during a first episode, the motion task performed by a first multi-layer perceptron (MLP);

perform an interaction task to produce a second result during navigation of the first episode;

compute a Q value change from the first task result and the second task result using a second MLP;

modify parameters of the first MLP and the second MLP based on the Q value change; and iteratively perform the motion task, the interaction task, computing the Q value change, and modifying parameters of the first MLP and the second MLP on episodes of the navigation subsequent to the first episode.

18. The at least one machine readable medium of claim 17 wherein transition between the motion task and interaction task is continuous.

19. The at least one machine readable medium of claim 17 wherein the first MLP is coupled to an object detection subnet and a motion history subnet to form an obstacle avoidance network.

20. The at least one machine readable medium of claim 19 wherein the motion history subnet obtains motion history data from a replay memory of the device.

21. The at least one machine readable medium of claim 17 wherein the first MLP is coupled to an obstacle avoidance network and a motion direction subnet to form a navigation network.

22. The at least one machine readable medium of claim 17 wherein the second MLP is coupled to the first MLP and a task driven subnet.

23. The at least one machine readable medium of claim 22 wherein the task driven subnet obtains task-related data from an input to guide the device to perform the interaction task.

24. The at least one machine readable medium of claim 17 wherein the second MLP provides a first task result weight and a second task result weight when computing the Q value change.

* * * * *

UNITED STATES PATENT AND TRADEMARK OFFICE
CERTIFICATE OF CORRECTION

| | |
|---|---|
| PATENT NO. | : 11,494,641 B2 |
| APPLICATION NO. | : 16/651282 |
| DATED | : November 8, 2022 |
| INVENTOR(S) | : Chen et al. |

It is certified that error appears in the above-identified patent and that said Letters Patent is hereby corrected as shown below:

On the Title Page

Item (71), in "Applicant", in Column 1, Line 1, delete "COPRPORATION," and insert --CORPORATION,-- therefor In the Claims In Column 22, Line 54, in Claim 9, delete "caching" and insert --teaching-- therefor Signed and Sealed this
Twenty-second Day of August, 2023

Katherine Kelly Vidal
*Director of the United States Patent and Trademark Office*